Feb. 28, 1928.
C. C. FARMER
1,660,485
FLUID PRESSURE BRAKE
Filed April 23, 1927
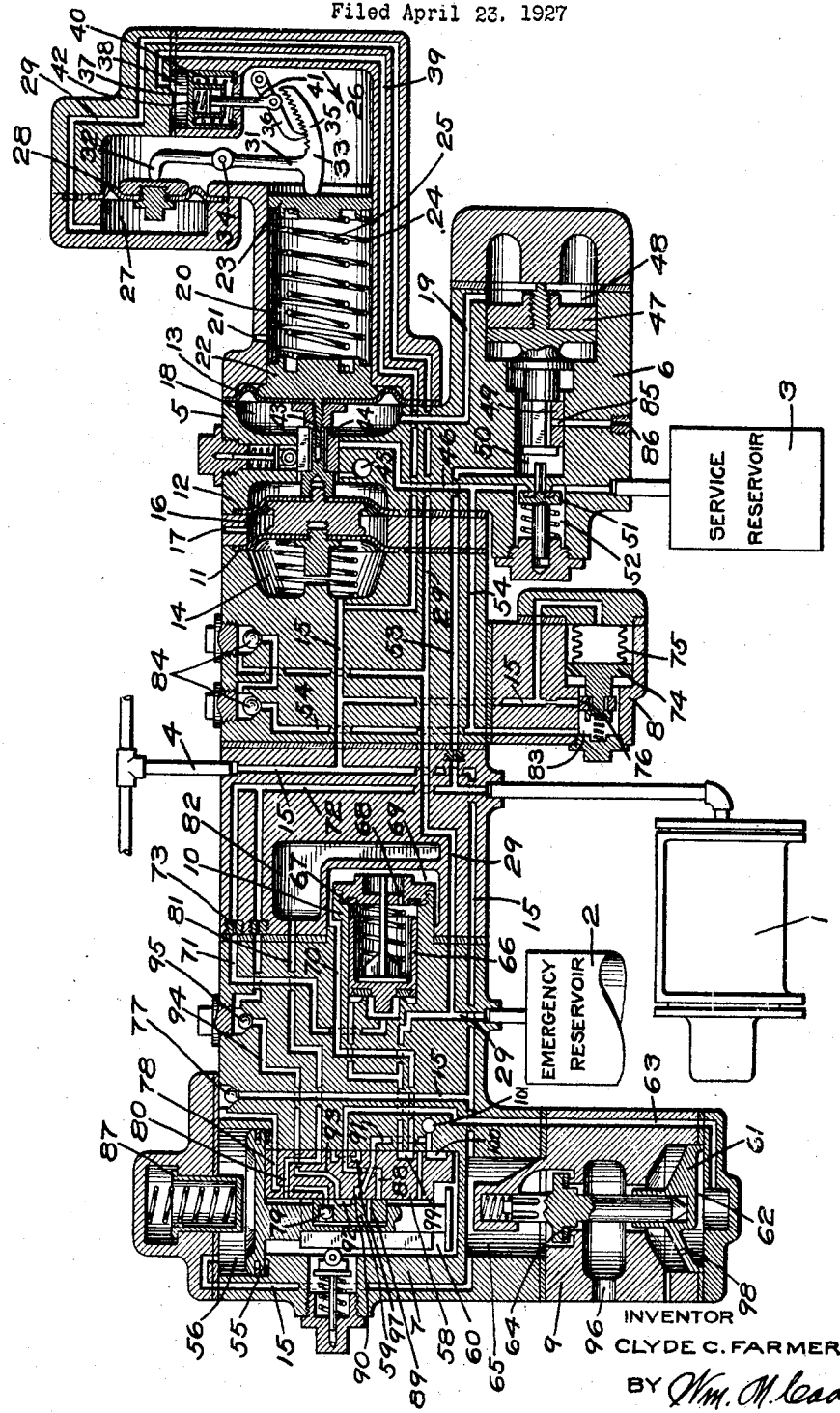
INVENTOR
CLYDE C. FARMER
BY Wm. M. Cady
ATTORNEY Patented Feb. 28, 1928.

1,660,485

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 23, 1927. Serial No. 185,977.

This invention relates to fluid pressure brakes and has for its principal object to provide an improved brake controlling apparatus.

Other objects and advantages will appear in the following more detailed description of the invention.

In the accompanying drawing, the single figure is a diagrammatic sectional view of a brake controlling valve device embodying my invention.

The apparatus may comprise a brake cylinder 1, an emergency reservoir 2, a service reservoir 3, a brake pipe 4, a service pilot valve 5, a service application valve device 6, an emergency valve device 7, a reservoir charging valve device 8, a quick action valve device 9, and an emergency application supply valve device 10.

The reservoir pilot valve 5 comprises a series of connected flexible diaphragms 11, 12 and 13, spaced apart to form chambers. The chamber 14, at the left of diaphragm 11, is connected to a passage 15 leading to the brake pipe 4. The chamber 16, intermediate the diaphragms 11 and 12 is open to the atmosphere through a port 17. The chamber 18, intermediate the diaphragms 12 and 13 is connected to a passage 19. At the right of the diaphragm 13 there is a chamber 20 which is open to the atmosphere through a port 21, and contains spaced followers 22 and 23 between which there is interposed springs 24 and 25. To the right of the follower 25 there is a chamber 26 which is separated from a chamber 27 by a flexible diaphragm 28, such chamber 27 being connected with the emergency reservoir through a passage 29.

The chamber 26 contains a lever member 31 which intermediate its ends 32 and 33, is operatively mounted on a fulcrum pin 34. The end 32 of the lever cooperates with the diaphragm 28 and a portion of the end 33 cooperates with the follower 25 contained in the chamber 20. The end 33 is provided with a toothed rack 35 which is adapted to be engaged by a pawl 36 pivotally mounted at one end and operable by a piston 37 contained in a chamber 38 which connects with the brake pipe through a passage 39 and the passage 15. The piston 37 is operable in one direction by fluid under brake pipe pressure and in the opposite direction by a spring 40. The pawl 36 is preferably loosely connected with the piston by a rod 41, there being a spring 42 preferably interposed between the piston and the rod for yieldably holding the pawl in engagement with the rack portion 35 of the lever 31.

The connecting stem 43 of the diaphragms 11, 12 and 13 is adapted to operate a slide valve 44, and in release position of the slide valve, the chamber 18 is connected to an exhaust port 45. In application position, chamber 18 is connected to a passage 46 leading to service reservoir 3.

The service application device 6 comprises a piston 47 contained in a piston chamber 48, a release slide valve 49 contained in valve chamber 50 and a supply valve 51 contained in valve chamber 52, said valves being operated by the movement of the piston 47. Valve chamber 50 is connected through passage 53 with the brake cylinder 1, and valve chamber 52 is connected to service reservoir 3. The piston chamber 48 is connected with the chamber 18 through the passage 19.

The emergency valve device 7 comprises, a piston 55 contained in a piston chamber 56 which is connected to the brake pipe passage 15, and a main slide valve 58 and a graduating slide valve 59 contained in a valve chamber 60 and adapted to be operated by piston 55.

The quick action valve device 9 comprises a piston 61 contained in a piston chamber 62 which is connected to a passage 63, leading to the seat of the slide valve 58, and a brake pipe vent valve 64, contained in a valve chamber 65 and adapted to be operated by piston 61, the chamber 65 being connected to the brake pipe passage 15.

The emergency supply valve device 10 comprises a valve piston 66 having chamber 67, at the right of the valve piston, open through a restricted port 68, to a chamber 69, which is connected to a passage 70 leading to the seat of the slide valve 58. In the seated position of the valve piston 66, the outer seated area, connected to emergency reservoir passage 29, is cut off from an inner seated area which is connected, through a passage 71, with a brake cylinder passage 72, the passage 71 containing a choke plug having a restricted port 73.

The reservoir charging valve device 8, controls the charging of the emergency reservoir 2 and the service reservoir 3 and comprises a diaphragm head 74 connected to a bellows diaphragm 75 and adapted to operate a slide valve 76.

In operation, when fluid under pressure is supplied to the brake pipe 4, fluid flows through the brake pipe passage 15 to the piston chamber 56 of the emergency valve device 7 and through passage 15, past a ball check valve 77 to the seat of slide valve 58. With the emergency valve device 7 in release position, as shown in the drawing, the brake pipe passage 15 registers with a port 78 through the slide valve 58, so that fluid flows from the brake pipe through said port and through a port controlled by a check valve 79 in the slide valve 59 to the valve chamber 60, and from this chamber fluid flows through a port 80 and passage 81 to a quick action chamber 82.

When the brake pipe pressure has been increased to a predetermined degree, the charging valve device 8 is operated so as to shift the slide valve 76 and open passage 15 to valve chamber 83 which is connected to the passage 54, so that fluid under pressure in this passage 54 flows past check valves 84 to passage 29 leading to the emergency reservoir 2. Fluid also flows from passage 54 to valve chamber 52 and service reservoir 3, so that both of the reservoirs 2 and 3 are charged with fluid under pressure, and as the chamber 27 is connected with the emergency reservoir 2 through passage 29, and the piston chamber 38 is connected with the brake pipe 4 through passages 39 and 15, they will also be charged at brake pipe pressure.

With the chamber 14 of the valve device 5 charged to the standard brake pipe pressure, the parts are so proportioned that the slide valve 44 is held in its right hand position, in which the chamber 18 is open to exhaust port 45. The chamber 18 being at atmospheric pressure, the chamber 48 is also at atmospheric pressure, since these chambers are connected by way of passage 19.

With the piston chamber 48 at atmospheric pressure, the piston 47 will be in its right hand position, as shown in the drawing, in which position, chamber 50 is connected through a port 85 in the slide valve 49 with an atmospheric exhaust passage 86. The chamber 50 is connected to the brake cylinder passage 53 so that the brake cylinder 1 is now open to the exhaust, and the brakes are released.

If it is desired to effect a service application of the brakes, the brake pipe pressure is reduced in the usual manner, and consequently the pressure in the diaphragm chamber 14 and piston chamber 38 is reduced to the same extent, thus permitting the springs 24 and 25 to shift the slide valve 44 toward the left so as to close the exhaust port 45 and open passage 46 to the chamber 18. Fluid under pressure is then supplied from the service reservoir 3 through passage 46 to chamber 18 and continues to flow until the pressure in said chamber has increased to a degree sufficient to move the diaphragms to the right against the action of the springs 24 and 25, by reason of the differential area of the diaphragm 13 with respect to the diaphragm 12.

When a service application of the brakes is made, the reduction of pressure in the chamber 38 will not be great enough to permit the piston 37 to be operated to move the pawl 36 out of engagement with the lever 31, and this is due to the spring 40 being of such proportion that before it is permitted to move the piston 37, the reduction in pressure in the chamber 38 must be considerably greater than any service reduction which may be made.

The pressure of fluid in piston chamber 48 is built up by the flow from the chamber 18 and the piston 47 is thereby moved toward the left, first moving the slide valve 49 to close the exhaust port 86 and then operating to unseat the valve 51.

With valve 51 unseated, fluid under pressure is supplied from the service reservoir 3 through passage 46 and chamber 52 to chamber 50 and from thence through passages 53 and 72 to the brake cylinder 1. The brake cylinder pressure is thus built up until the pressure in valve chamber 50, acting on the piston 47, slightly exceeds the pressure of fluid in piston chamber 48, when the piston will be moved toward the right sufficiently to permit the valve 51 to seat.

Should leakage from piston chamber 48 or from valve chamber 18 occur, the springs 24 and 25 will move the diaphragms of the valve device 5 to the left and again open communication from supply passage 46 to chambers 18 and 48, and sufficient fluid will be supplied to compensate for the leakage and maintain the pressure in said chambers substantially constant.

If leakage from the brake cylinder 1 should occur, the corresponding fall in pressure in chamber 50 will cause piston 47 to be moved to the left so as to again open the valve 51 and permit fluid under pressure supplied to the brake cylinder to compensate for the leakage.

The piston 55 of the emergency valve device 7 is also moved outwardly, due to the reduction in brake pipe pressures, until the piston engages a spring stop 87. The auxiliary slide valve 59 is thus moved relatively to the main slide valve 58, but not sufficiently to uncover a port 88 in the slide valve 58. In this movement, a port 89 in the valve 59 registers with a port 90 in the slide valve 58, which in turn registers with an exhaust passage 91, so that fluid under pressure is vented from the valve chamber 60 and the quick action chamber 82 to prevent further outward movement of the piston 55 toward emergency position. Further, in this movement, a cavity 92 in the auxiliary valve 59 connects a port 93 with port 78, so that fluid is vented from the brake pipe 4 through brake pipe passage 15 to passage 94, and past a check valve 95 to brake cylinder passage 72. A local venting of fluid from the brake pipe is thus produced, so that quick serial action in service is effected.

When a sudden reduction in brake pipe pressure is made to effect an emergency application of the brakes, the emergency piston 55 will be shifted to emergency position, compressing the spring stop 87. In this movement, the slide valve 59 first moves to uncover port 88, so that fluid under pressure is supplied from valve chamber 60 through passage 63 to the quick action piston 61. Said piston is then operated to open the vent valve 64 and permit fluid to be vented from the brake pipe through passage 15 to an atmospheric port 96. As the chamber 38 is connected with the brake pipe, the fluid under pressure in this chamber will also be vented, so that the spring 40 will operate the piston 37 to move the pawl 36 out of engagement with the lever 31 as hereinafter more fully described.

The main valve 58 is then moved so that a cavity 97 therein, connects the passage 81 with passage 63. The piston chamber 62 is thus connected to the quick action chamber 82 and the piston 61 is held in its position with the valve 64 open, until the pressure in the quick action chamber 82 blows down by way of a restricted port 98 in piston 61.

In the release position of the emergency slide valve 58, a cavity 99 connects passage 29 with passage 70 so that chamber 69 of the high pressure emergency valve device 10 is charged with fluid from the emergency reservoir 2. In emergency position, a cavity 100 in the slide valve 58 connects passage 70 with an exhaust port 101, so that fluid is vented from chamber 69 and also from chamber 67, and the valve piston 66 is then shifted to the right. Fluid under pressure from the emergency reservoir 2 is then supplied directly to the passage 71 and through passage 72 to the brake cylinder 1.

With the mechanism hereinbefore described, the pressure of the springs 24 and 25 will be varied by any increase in maximum standard brake pipe pressure, that is to say, if the brake pipe pressure is increased, for example, from 70 to 90 pounds, the springs will be compressed and the pressure thereof increased in proportion to the brake pipe pressure; and if the brake pipe pressure is further increased to 110 pounds the pressure of the springs will be proportionately increased, so that the brake cylinder pressure will be increased as the brake pipe pressure is increased.

Assuming the chambers 27 and 38 of the valve device 5 to be charged at standard brake pipe pressure, and the lever 31 to be in the position as shown in the drawing, in which position the end 32 will be in engagement with the diaphragm 28, and a portion of the end 33 will be in engagement with the follower 23, while the rack portion 35 of this latter end will be engaged by the pawl 36. Should the emergency reservoir pressure be increased, this increased pressure in the chamber 27, acting upon the diaphragm 28, will cause the lever 31 to be rotated about its fulcrum, in the direction as indicated by the arrow in the drawing, causing the follower 23 to be moved to sufficiently compress the springs 24 and 25, so that the pressure of the springs will be properly proportioned to the brake pipe pressure. As relative movement is permitted between the piston 37 and the rod 41, the pawl 36 will be permitted to reciprocate as the rack portion 35 of the lever is moved, the spring 42 tending to maintain the pawl in engagement with the teeth of the portion 35. When the rack portion is in its proper adjusted position, the pawl will engage the teeth of such portion and will maintain the lever and follower 23 in their adjusted positions, so that, in the event of any leakage of emergency reservoir pressure, the adjustment of the springs 24 and 25 will not be varied.

To release the lever 31, so that the springs 24 and 25, and follower 23 may return to their normal positions, it is required that an emergency application be effected and substantially the complete venting of fluid under pressure from the valve chamber 38. When this is done, the spring 40, which has been compressed, will move the piston 37 a sufficient distance that the pawl 36 will be moved thereby out of engagement with the teeth of the rack portion 35 of the lever, thus permitting the springs 24 and 25, which have been compressed, to move the follower 23 and lever 31 to a position where the pressure of these springs is balanced by the decreased emergency reservoir pressure in the chamber 27.

When a car equipped with the invention is out of service, the brake system will be deplete of fluid under pressure and the lever 31 and associated parts will be in their normal released positions, so that when the car is again put into service the device will automatically adjust itself to the maximum brake pipe pressure carried by the train.

Having now described my invention, what I claim as new and desire to secure by Letters Patent, is:—

1. In a fluid pressure brake, the combination with a brake cylinder, of a valve device subject to brake cylinder pressure for controlling the brakes, continually acting pressure exerting means for opposing brake cylinder pressure on said valve device, and means for automatically varying the pressure of said pressure exerting means.

2. In a fluid pressure brake, the combination with a brake pipe and brake cylinder, of a valve device subject to brake cylinder pressure for controlling the brakes, pressure exerting means for opposing brake cylinder pressure on said valve device, and means for increasing the pressure of said pressure exerting means as the brake pipe pressure is increased.

3. In a fluid pressure brake, the combination with a brake pipe and brake cylinder, of a valve device subject to brake cylinder pressure for controlling the brakes, pressure exerting means for opposing brake cylinder pressure on said valve device, and means for varying the pressure of said pressure exerting means to correspond with the maximum brake pipe pressure carried.

4. In a fluid pressure brake, the combination with a brake pipe, a reservoir charged by fluid under pressure from said brake pipe and a brake cylinder, of a valve device operable upon a reduction in brake pipe pressure for controlling the brakes, and continually acting pressure exerting means operable upon an increase in pressure in said reservoir for regulating the pressure required to operate said valve device.

5. In a fluid pressure brake, the combination with a brake pipe, a reservoir charged by fluid under pressure from said brake pipe and a brake cylinder, of control means operable upon a reduction in brake pipe pressure for supplying fluid under pressure to brake cylinder to apply the brakes, mechanism operable upon an increase in pressure in said reservoir for varying the pressure required to operate said control means, and means for locking said mechanism in its various operative positions.

6. In a fluid pressure brake, the combination with a brake pipe, a reservoir charged by fluid under pressure from said brake pipe and a brake cylinder, of control means operable upon a reduction in brake pipe pressure for supplying fluid under pressure to brake cylinder to apply the brakes, mechanism operable upon an increase in pressure in said reservoir for varying the pressure required to operate said control means, and means operable by fluid under brake pipe pressure for locking said mechanism in operative positions.

7. In a fluid pressure brake, the combination with a brake pipe, a reservoir charged by fluid under pressure from said brake pipe and a brake cylinder, of control means operable upon a reduction in brake pipe pressure for supplying fluid under pressure to brake cylinder to apply the brakes, mechanism operable upon an increase in pressure in said reservoir for varying the pressure required to operate said control means, and means operable by fluid under brake pipe pressure for locking said mechanism in operative positions, said means being movable out of its locking position upon a predetermined brake pipe pressure.

8. In a fluid pressure brake, the combination with a brake pipe, emergency and service reservoirs and a brake cylinder, of control means operable upon a reduction in brake pipe pressure for supplying fluid under pressure from said service reservoir to said brake cylinder to apply the brakes, and means operable upon an increase in emergency reservoir pressure for adjusting said control means to operate at an increased pressure.

9. In a fluid pressure brake, the combination with a brake pipe, emergency and service reservoirs and a brake cylinder, of control means operable upon a reduction in brake pipe pressure for supplying fluid under pressure from said service reservoir to said brake cylinder to apply the brakes, a flexible diaphragm operable by fluid under pressure from said emergency reservoir, and means operable by said diaphragm for regulating said control means to vary the brake cylinder pressure.

10. In a fluid pressure brake, the combination with a brake pipe, emergency and service reservoirs and a brake cylinder, of control means operable upon a reduction in brake pipe pressure for supplying fluid under pressure from said service reservoir to said brake cylinder to apply the brakes, a flexible diaphragm operable by fluid under pressure from said emergency reservoir, a pressure mechanism, and a lever operated by said diaphragm for operating said mechanism to increase the pressure thereof in proportion to any increase in the emergency reservoir pressure.

11. In a fluid pressure brake, the combination with a brake pipe, emergency and service reservoirs and a brake cylinder, of control means operable upon a reduction in brake pipe pressure for supplying fluid under pressure from said service reservoir to said brake cylinder to apply the brakes, a flexible diaphragm operable by fluid under pressure from said emergency reservoir, a pressure mechanism, a lever operated by said diaphragm for operating said mechanism to regulate the pressure thereof in proportion to any increase in the emergency reservoir pressure, and means for locking said lever.

12. In a fluid pressure brake, the combination with a brake cylinder, of a valve device subject to brake cylinder pressure for controlling the brakes, a spring constantly opposing brake cylinder pressure in said valve device, and means for automatically varying the pressure of said spring.

13. In a fluid pressure brake, the combination with a brake pipe and brake cylinder, of a valve device subject to brake cylinder pressure for controlling the brakes, a spring opposing brake cylinder pressure on said valve device, and means for increasing the pressure of said spring as the pressure of the brake pipe is increased.

14. In a fluid pressure brake, the combination with a brake cylinder, of a valve device subject to brake cylinder pressure for controlling the brakes, a reservoir charged with fluid under pressure, a spring opposing brake cylinder pressure on said valve device, and means for increasing the pressure of said spring according to the pressure in said reservoir.

15. In a fluid pressure brake, the combination with a brake cylinder, of a valve device subject to brake cylinder pressure for controlling the brakes, a reservoir charged with fluid to the pressure carried in the brake pipe, a spring opposing brake cylinder pressure on said valve device, and means for increasing the pressure of said spring.

16. In a fluid pressure brake, the combination with a brake cylinder, of a valve device subject to brake cylinder pressure for controlling the brakes, a reservoir charged with fluid to the pressure carried in the brake pipe, a spring opposing brake cylinder pressure on said valve device, means for adjusting the pressure of said spring, and a pawl movable into or out of locking engagement with said means.

17. In a fluid pressure brake, the combination with a brake cylinder, of a valve device subject to brake cylinder pressure for controlling the brakes, a reservoir charged with fluid to the pressure carried in the brake pipe, a spring opposing brake cylinder pressure on said valve device, means for adjusting the pressure of said spring, and a ratchet mechanism movable into or out of operative locking engagement with said means.

In testimony whereof I have hereunto set my hand.

CLYDE C. FARMER.